(12) United States Patent
Snyder

(10) Patent No.: US 10,136,575 B2
(45) Date of Patent: Nov. 27, 2018

(54) PRODUCT ROW BANDING ASSEMBLY FOR AIR DELIVERY MACHINES

(71) Applicant: AGCO Corporation, Duluth, GA (US)

(72) Inventor: Todd B. Snyder, Jackson, MN (US)

(73) Assignee: AGCO Corporation, Duluth, GA (US)

(*) Notice: Subject to any disclaimer, the term of this patent is extended or adjusted under 35 U.S.C. 154(b) by 0 days.

(21) Appl. No.: 15/653,032

(22) Filed: Jul. 18, 2017

(65) Prior Publication Data

US 2018/0027726 A1 Feb. 1, 2018

Related U.S. Application Data

(60) Provisional application No. 62/367,701, filed on Jul. 28, 2016.

(51) Int. Cl.
| | |
|---|---|
| *A01C 7/08* | (2006.01) |
| *A01C 15/00* | (2006.01) |
| *A01C 21/00* | (2006.01) |
| *B01D 45/16* | (2006.01) |
| *B04C 5/08* | (2006.01) |
| *B04C 5/12* | (2006.01) |

(52) U.S. Cl.
CPC .............. *A01C 15/00* (2013.01); *A01C 7/082* (2013.01); *A01C 21/00* (2013.01); *B01D 45/16* (2013.01); *B04C 5/12* (2013.01); *A01C 15/006* (2013.01)

(58) Field of Classification Search
CPC .. A01C 7/04; A01C 7/042; A01C 7/08; A01C 7/081; A01C 7/082; A01C 7/084; A01C 15/00; A01C 15/006; A01C 21/00; B01D 45/12; B01D 45/16; B04C 5/08; B04C 5/12

See application file for complete search history.

(56) References Cited

U.S. PATENT DOCUMENTS

| 7,509,915 | B2 * | 3/2009 | Memory ................ A01C 7/082 |
| | | | 111/174 |
| 2002/0144637 | A1 * | 10/2002 | Wendling ............... A01C 7/042 |
| | | | 111/163 |

(Continued)

FOREIGN PATENT DOCUMENTS

| EP | 0903068 A1 | 3/1999 |
| WO | 2015/052205 A1 | 4/2015 |

OTHER PUBLICATIONS

UK Intellectual Property Office, International Search Report for related UK Application No. GB1614054.3, dated Feb. 20, 2017.

*Primary Examiner* — Darren W Gorman

(57) ABSTRACT

An agricultural spreader has a hopper containing a granular product and a boom arm supporting a plurality of product delivery conduits supplying a plurality of row banding assemblies configured to disperse the product. The spreader has a pneumatic supply to propel the granular product through the product delivery conduits to the row banding assemblies. Each of the plurality of row banding assemblies includes a cyclone separator having an inlet connected to the product delivery conduit, a product outlet at a bottom end of the cyclone separator, an air outlet at a top end of the cyclone separator. The row banding assembly has a product placement tube connected to the product outlet, and an air exhaust tube connected to the air outlet. The air exhaust tube extends downward and surrounds the product placement tube.

4 Claims, 2 Drawing Sheets

(56) References Cited

U.S. PATENT DOCUMENTS

Figure 1:
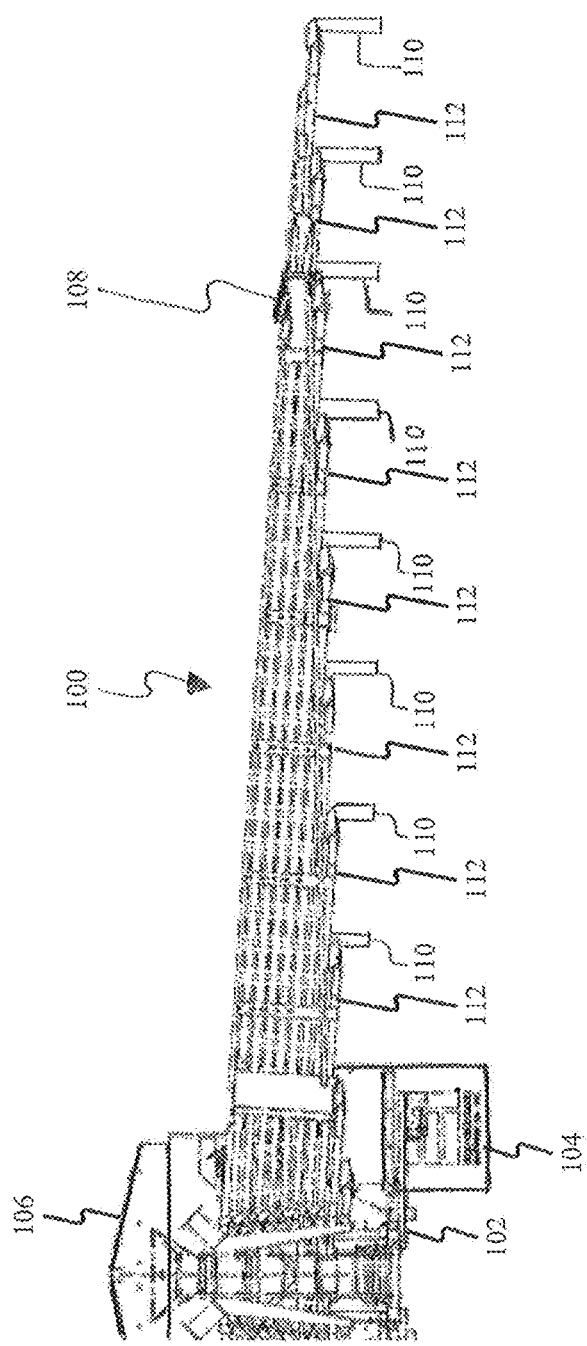

| | | | |
|---|---|---|---|
| 2014/0048612 A1 | 2/2014 | Snyder et al. | |
| 2015/0101518 A1* | 4/2015 | Arnold .................. | A01C 7/082 111/174 |
| 2015/0189828 A1* | 7/2015 | Gilstring ............... | A01C 7/081 111/174 |
| 2016/0242352 A1* | 8/2016 | Hussherr ............... | A01C 7/081 |

* cited by examiner

PRODUCT ROW BANDING ASSEMBLY FOR AIR DELIVERY MACHINES

CROSS REFERENCE TO RELATED APPLICATION

This application claims the benefit of U.S. Provisional Application No. 62/367,701 filed Jul. 28, 2016, which is hereby incorporated by reference in its entirety.

BACKGROUND OF THE INVENTION

Field of Invention

The present invention relates generally to an agricultural spreader, and more particularly to an agricultural spreader configured to deliver a granular product in a row band.

Description of Related Art

The high crop yields of modern agribusiness require application of fertilizers, pesticides, and herbicides. Dispersing these chemicals onto high acreage fields requires specialized machines mounted on or towed by a vehicle. An example of such a machine is the self-propelled agricultural spreader.

A common design for a self-propelled agricultural spreader includes a dedicated chassis with a product hopper, boom arms, and spreader nozzles connected to the boom arms. The hopper contains granular product such as fertilizers, pesticides, and herbicides to be spread on agricultural crops in the field. Boom arms extend outward from the sides of the chassis. Each boom arm includes a series of pipes which are horizontal and arranged either in single or multiple rows. The inner ends of the pipes are connected to supply lines and a manifold so that air from a fan blows through the pipes to carry the granular product along the respective pipe to a spreader system at the end of the pipe. Nozzles in the pipes are spaced apart along the length of the boom arms at a standard spacing distance which corresponds to the spread pattern of the nozzles.

In operation, as the agricultural spreader crosses the field, granular product is pneumatically applied from the tank through the supply lines along the boom arms, and out through the nozzles. This allows the agricultural spreader to distribute the granular product along a relatively wide path. The length of conventional boom arms may vary from, for example, 6 meters (18 feet) up to 46 meters (150 feet), but smaller or longer booms are possible. The boom arms typically swing in for transport and out for operation.

Current spreaders typically use nozzles that distribute the product in a fan shape so that the product is distributed evenly to the ground across the width of the boom arms. However, in some situations, it would be desirable to deliver the product in a band between planted rows of crops rather than in an even pattern.

OVERVIEW OF THE INVENTION

In one embodiment, an agricultural spreader has a hopper containing a granular product and a boom arm supporting a plurality of product delivery conduits supplying a plurality of row banding assemblies configured to disperse the product. The spreader has a pneumatic supply to propel the granular product through the product delivery conduits to the row banding assemblies. Each of the plurality of row banding assemblies includes a cyclone separator having an inlet connected to the product delivery conduit, a product outlet at a bottom end of the cyclone separator, an air outlet at a top end of the cyclone separator. The row banding assembly has a product placement tube connected to the product outlet, and an air exhaust tube connected to the air outlet. The air exhaust tube extends downward and surrounds the product placement tube.

Another aspect of the invention is a method of dispensing granular product from a hopper on an agricultural spreader. The method includes directing granular product to flow from the hopper through a product delivery conduit using pressurized air and then directing the pressurized air and product into a cyclone separator. The method includes directing pressurized air out of an air outlet of the cyclone separator and into an exhaust tube and directing the product out of the cyclone separator through a product outlet and into a product placement tube. The outlet tube is directed so that the air outlet tube surrounds the product placement tube.

These and other features and advantages of this invention are described in, or are apparent from, the following detailed description of various example embodiments of the systems and methods according to this invention.

BRIEF DESCRIPTION OF THE DRAWINGS

The above mentioned and other features of this invention will become more apparent and the invention itself will be better understood by reference to the following description of embodiments of the invention taken in conjunction with the accompanying drawings, wherein:

FIG. 1 is an elevational view of a portion of an agricultural spreader with a boom arm; and FIG. 2 is a schematic drawing showing a row banding assembly on a boom arm of the agricultural spreader of FIG. 1.

The drawing figures do not limit the present invention to the specific embodiments disclosed and described herein. The drawings are not necessarily to scale, emphasis instead being placed upon clearly illustrating the principles of the preferred embodiment. Corresponding reference characters indicate corresponding parts throughout the views of the drawings.

DETAILED DESCRIPTION OF THE PREFERRED EMBODIMENTS

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

FIG. 1 shows an agricultural spreader 100 having a frame 102. The frame 102 may be of unitary construction or may include one or more pieces secured together. The frame 102 may comprise a support frame that spans the length of the agricultural spreader 100 and provides a structure for mounting other components on agricultural spreader 100. The agricultural spreader 100 also include a cab (not shown) mounted on frame 102. The cab houses an operator and a number of controls for the agricultural spreader 100. The frame 102 is supported by a plurality of wheels 104. An engine (not shown) is used to provide energy to drive the wheels 104 and propel the agricultural spreader 100 over the ground and also provide energy used to spread granular product from the agricultural spreader 100. Propulsion and direction of the agricultural spreader 100 may be controlled by one or more operator controls that include, but are not limited to, an accelerator (not shown), a brake (not shown), and a steering wheel (not shown). While a self-propelled agricultural spreader 100 is shown while describing embodiments of the invention, one skilled in the art will understand that the invention may also be used is a towed agricultural spreader without departing from the scope of the invention.

The agricultural spreader 100 further includes a hopper 106 mounted on frame 102 used to store a granular product to be spread on a field. The granular product may comprise chemicals, such as but not limited to, herbicides, pesticides, or fertilizers, or the product hopper 106 may comprise seed. The agricultural spreader 100 may include more than one hopper to store different products to be applied on the field.

The agricultural spreader 100 further includes a boom arm 108 operable to distribute the granular product over a wide swath in the field. As will be described in greater detail below, a plurality of row banding assemblies 110 are spaced along the boom arm 108 through which the granular product may be spread as agricultural spreader 100 is driven forward in the field to distribute the chemicals onto crops in the field. The operator of the agricultural spreader 100 uses controls located within the cab to control the boom arm 108 and the granular product dispersion through the row banding assemblies 110. The operator may use controls to turn on the granular product flow to the plurality of row banding assemblies 110 and to shut off the granular product flow to the plurality of row banding assemblies 110.

The boom arm 108 comprises a plurality of product delivery conduits 112 connecting to the row banding assemblies 110. The product delivery conduits 112 are fluidly connected to the hopper 106 to allow the granular product to flow from the hopper 106 to the plurality of row banding assemblies 110. As is known in the art, a pneumatic supply propels the granular product through the product delivery conduits 112. While FIG. 1 shows each product delivery conduit 112 connected to a single row banding assembly 110, embodiments may comprise two or more row banding assemblies 110 connected a single product delivery conduit 112. Product delivery conduits 112 may be an integral part of agricultural spreader 100 or may be detachable from agricultural spreader 100. For example, product delivery conduits 112 may be permanently attached to or located within boom arm 108. Product delivery conduits 112 may also be separable from boom arm 108.

Figure 2:
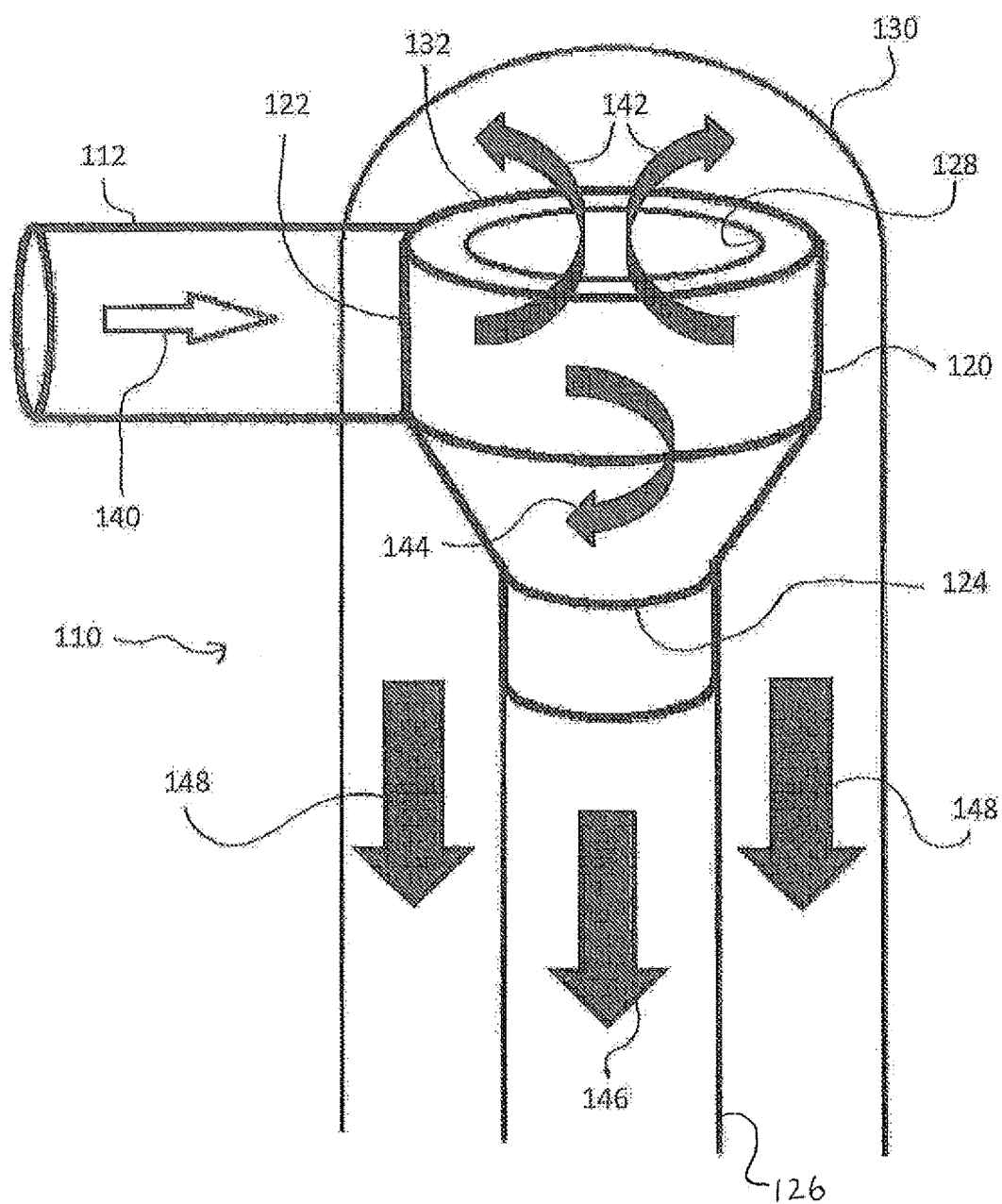

Turning now to FIG. 2, each row banding assembly 110 includes a cyclone separator 120 connected to the product delivery conduit 112 at an inlet 122 of the row banding assembly 110. The cyclone separator 120 receives the product and pressurized air being carried within the product delivery conduit 112. A product outlet 124 at the bottom of the cyclone separator 120 connects to a downward extending product placement tube 126. Extending from of the top of the cyclone separator 120 is an air outlet 128, which connects to an air exhaust tube 130 and provides a discharge for the pressurized air received from the product delivery conduit 112. The exhaust tube 130 covers the cyclone separator 120 and extends downward such that the exhaust tube 130 surrounds the product placement tube 126. A circular airway 132 extends from the inlet 122 around the cyclone separator 120 such that the cyclone separator 120 reduces the air velocity into the product placement tube 124 to near zero as the pressurized air is directed out of the cyclone separator 120 to the exhaust tube 130. As a result, the product exits the cyclone separator 120 through product outlet 124 and product placement tube 126.

During operation, an operator causes granular product to flow from the hopper 106 of the agricultural spreader 100 through the product delivery conduit 112 by operation of valves through any known means as would be understood in the art. As illustrated by the arrow 140 in FIG. 2, pressurized air and product enter the cyclone separator 120 through inlet 122. The product continues around the interior of the cyclone separator 120 as the pressurized air, shown by arrow 142, escapes out of the air outlet 128 of the cyclone separator 120 and into the exhaust tube 130. As the pressurized air exits through the exhaust tube 130, the product loses its velocity and exits the cyclone separator 120 through the product outlet 124 as indicated by arrow 144 and into the product placement tube 126 as shown by arrow 146. The pressurized air escaping out of the air outlet 128 is directed downward around the product placement tube 126 by the air exhaust tube 130 as shown by arrows 148.

Desirably, the product placement tube 126 is made of a flexible yet durable material, such as canvas, that can withstand buffeting from the granular product dropping down through the tube. The air exhaust tubes 130 are desirably made of a flexible material, such as nylon, that can inflate as the pressurized air is directed through the tube and stiffen around the product placement tube 126 encompassed therein to give the tubes a straight form so as to space each product placement tube 126 equally across the boom arm 108 and accurately direct the product toward the ground. When the pressurized air source is turned off, the air exhaust tubes 130 deflate to allow for folding of the boom 108 into a transport position. The product placement tubes 126 and air exhaust tubes 130 desirably can be folded and moved out of the way to keep the tubes from catching on obstacles during transport. Desirably, the row banding assembly 110 is rigidly mounted to the boom arm 108 such as by straps or other securing device such that the row banding assembly 110 may be removed and replaced with a traditional output nozzle when even spreading of product is desired.

While this invention has been described in conjunction with the specific embodiments described above, it is evident that many alternatives, combinations, modifications and variations are apparent to those skilled in the art. Accordingly, the preferred embodiments of this invention, as set forth above are intended to be illustrative only, and not in a limiting sense. Various changes can be made without departing from the spirit and scope of this invention.

What is claimed is:

1. An agricultural spreader having a hopper containing a granular product and a boom arm supporting a plurality of product delivery conduits supplying a plurality of row banding assemblies configured to disperse the product and a pneumatic supply to propel the granular product through the plurality of product delivery conduits to the plurality of row banding assemblies, wherein each of the plurality of row banding assemblies comprises:

a cyclone separator having an inlet connected to a respective one product delivery conduit of the plurality of product delivery conduits, a product outlet at a bottom end of the cyclone separator, an air outlet at a top end of the cyclone separator;

a product placement tube connected to the product outlet; and an air exhaust tube connected to the air outlet, wherein the air exhaust tube extends downward and surrounds the product placement tube.

2. The agricultural spreader of claim 1, wherein the cyclone separator comprises a circular airway extending from the inlet around the cyclone separator that directs pressurized air out of the cyclone separator to the air exhaust tube thereby reducing air velocity into the product placement tube and allowing the product to exit the cyclone separator through the product placement tube.

3. The agricultural spreader of claim 2, wherein the air exhaust tube is made of a flexible material that inflates and stiffens under influence of the pressurized air around the product placement tube to give the product placement tubes and air exhaust tubes a straight form across the boom arm to direct the product toward the ground.

4. A method of dispensing granular product from a hopper on an agricultural spreader, the method comprising:

directing granular product to flow from the hopper through a product delivery conduit using pressurized air;

directing the pressurized air and product into a cyclone separator;

directing the pressurized air out of an air outlet of the cyclone separator and into an exhaust tube;

directing the product out of the cyclone separator through a product outlet and into a product placement tube; and configuring the air outlet tube so that the air outlet tube surrounds the product placement tube.

* * * * *